US012661973B2

(12) United States Patent
Trudel et al.

(10) Patent No.: US 12,661,973 B2
(45) Date of Patent: Jun. 23, 2026

(54) ELECTRIC AXLE WITH DIRECT ROTOR AND HEAD SPRAY COOLING

(71) Applicant: DANA TM4 INC., Boucherville (CA)

(72) Inventors: Carl Trudel, Boucherville (CA); Steven Vanhee, Hooglede (BE); Luke Miller, Montreal (CA)

(73) Assignee: DANA TM4 INC., Boucherville (CA)

( * ) Notice: Subject to any disclaimer, the term of this patent is extended or adjusted under 35 U.S.C. 154(b) by 194 days.

(21) Appl. No.: 18/471,067

(22) Filed: Sep. 20, 2023

(65) Prior Publication Data

US 2024/0100936 A1     Mar. 28, 2024

Related U.S. Application Data

(60) Provisional application No. 63/376,738, filed on Sep. 22, 2022.

(51) Int. Cl.
B60K 11/02      (2006.01)
H02K 9/19       (2006.01)
B60K 1/00       (2006.01)

(52) U.S. Cl.
CPC ................ B60K 11/02 (2013.01); H02K 9/19 (2013.01); *B60K 2001/001* (2013.01)

(58) Field of Classification Search
CPC ........... H02K 5/203; H02K 5/15; H02K 5/18; H02K 5/20; H02K 9/193; H02K 7/006; H02K 7/116; H02K 9/19; H02K 11/33; H02K 5/04; H02K 1/32; B60K 1/00; B60K 11/02; B60K 2001/001; B60K 2001/006; Y02T 10/64; B60B 35/00
See application file for complete search history.

(56) References Cited

U.S. PATENT DOCUMENTS

| | | | | |
|---|---|---|---|---|
| 2010/0045125 A1* | 2/2010 | Takenaka | .................. | H02K 9/19 310/54 |
| 2013/0002064 A1* | 1/2013 | De Bock | ................ | H02K 9/197 310/54 |
| 2019/0273420 A1* | 9/2019 | Yasuda | .................... | H02K 1/20 |
| 2020/0204044 A1* | 6/2020 | Lee | ........................... | H02K 1/20 |
| 2020/0247236 A1* | 8/2020 | Hirao | ................... | B60K 17/046 |

* cited by examiner

*Primary Examiner* — Christopher M Koehler
*Assistant Examiner* — Viswanathan Subramanian
(74) *Attorney, Agent, or Firm* — McCoy Russell LLP

(57)     ABSTRACT

Methods and systems are provided for an electric axle in a vehicle. An electric axle includes an electric motor having a stator and a rotor, a coolant manifold mounted to a first end plate of the rotor, the first end plate opposite a second end plate distal to the coolant manifold, wherein the coolant manifold is configured to flow coolant to rotor coolant lines extending axially through the rotor, and a spray ring comprising coolant lines coupled to the coolant manifold, wherein coolant flowing from the coolant manifold to the spray ring flows in a direction angled to an axial direction, wherein the spray ring is positioned circumferentially about axial stator end windings and configured to spray coolant onto an outer diameter of the end windings, wherein the first end plate and the second end plate are configured to spray coolant onto an inner diameter of the end windings.

20 Claims, 12 Drawing Sheets

400

120

124

402

122

190

600
120
324
122
126
124
312
604
602
310
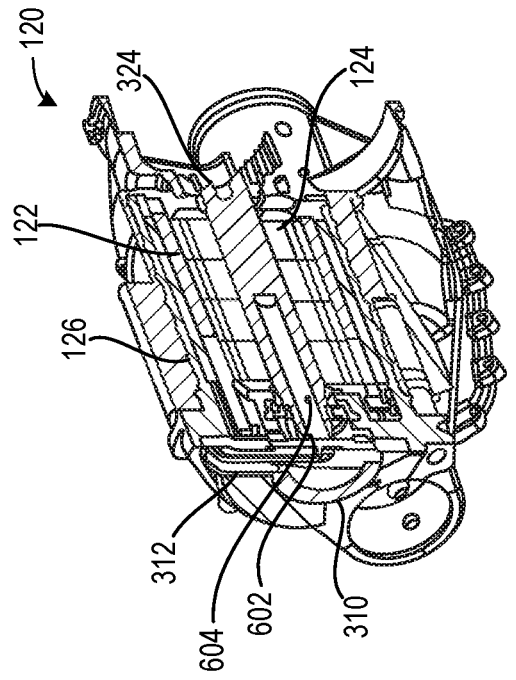
FIG. 6
190
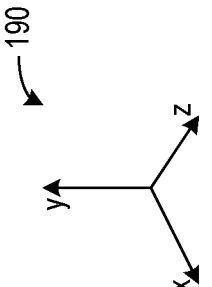

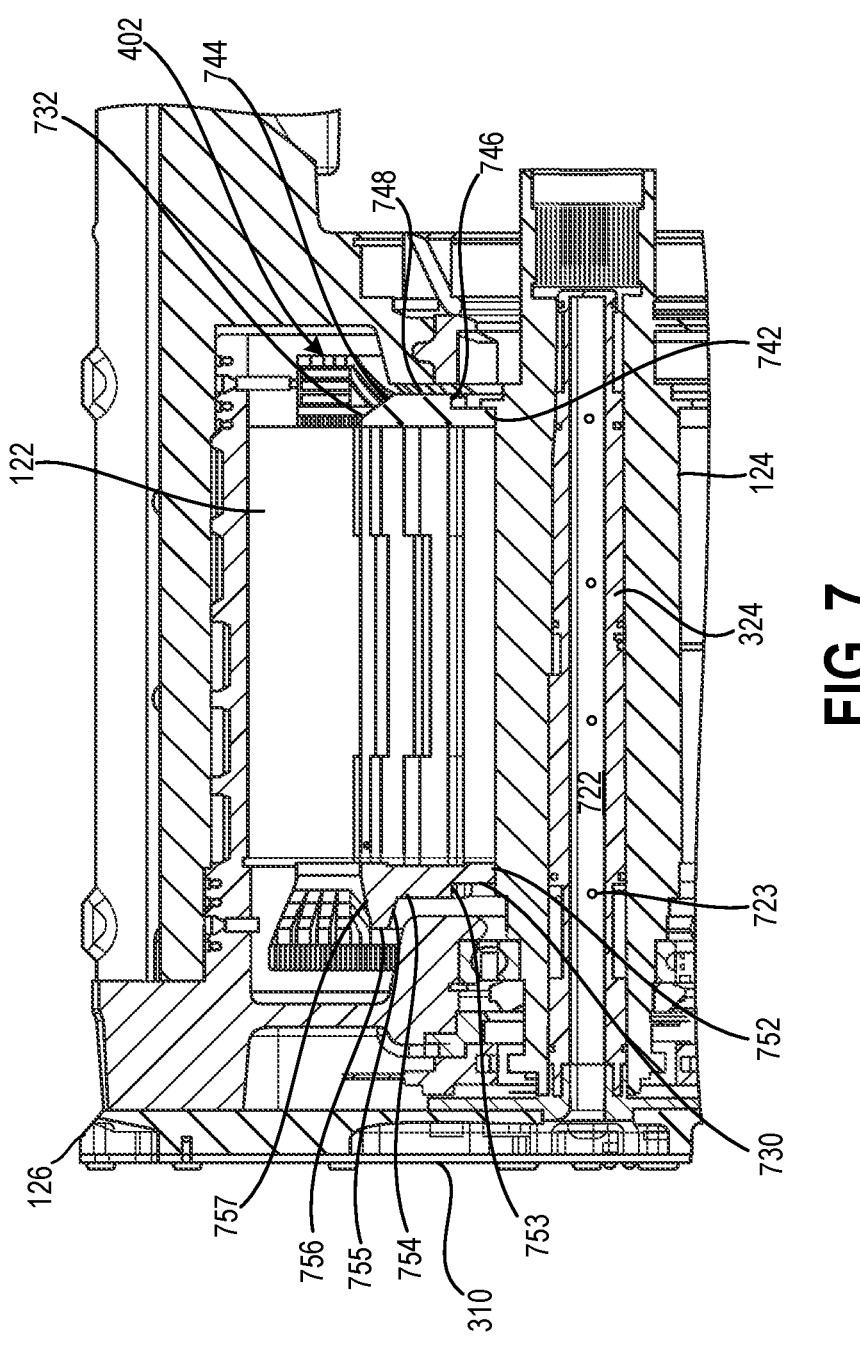
FIG. 7
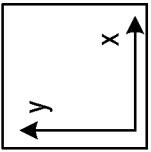

1200

1204

1202

190

ELECTRIC AXLE WITH DIRECT ROTOR AND HEAD SPRAY COOLING

CROSS REFERENCE TO RELATED APPLICATION

The present application claims priority to U.S. Provisional Application No. 63/376,738, entitled "ELECTRIC AXLE WITH DIRECT ROTOR AND HEAD SPRAY COOLING", and filed on Sep. 22, 2022. The entire contents of the above-listed application are hereby incorporated by reference for all purposes.

TECHNICAL FIELD

The present description relates generally to methods and systems for an electric axle, and, in particular, methods and systems directed to cooling an electric traction motor of the electric axle.

BACKGROUND AND SUMMARY

Electric axle assemblies and powertrain and control/electronic systems connected thereto require cooling and thermal management so as to remove heat from various components to improve performance characteristics of such components.

Electric axle assemblies typically comprise opposing half shafts with a driven differential therebetween, with wheel ends or hubs on the outward ends of the half shafts and powertrain components connected to the driven differential for delivering rotational power to the differential and, accordingly, one or both of the half shafts. An electric axle assembly comprises an electric motor configured to drive, via gearing, one or more of the wheel ends, typically via driving the gears associated with the driven differential. The vehicle within which the electric axle may be positioned and configured further comprises drive wheels and other powertrain components, typically including coolant handling systems, control systems comprising electronic circuitry and one or more controllers configured for controlling the coolant handling systems, and other components. The one or more controllers may comprise one or more sensors and actuators configured for control of one or more coolants The electric motor (such as an electric traction motor drivably connected to the driven differential) comprises an inverter for converting DC energy from a source of DC energy such as DC voltage from a battery (that may further comprise a charging system connected or connectable thereto), the inverter converting the DC energy to AC energy inputs to a rotor and a stator of the electric motor. The rotor may comprise a rotating component connectable via gearing to the driven differential, and the stator may comprise a stationary component affixed to structure such as a casing or enclose or housing of the electric motor that may be fixedly connected to other non-rotating structure of a powertrain of a vehicle.

The inverter generates heat and, accordingly, comprises coolant flow paths configured for receiving a coolant (such as for example, a coolant oil) for removing heat from the inverter electronic components (e.g., switches/power field effect transistors (power FETs)). The rotor and stator, wherein the rotor is configured to rotate interior to the stator, generate heat and, accordingly, comprise coolant flow paths configured for receiving a coolant (such as for example, a coolant oil) for removing heat from areas of the rotor generating heat (such as the areas of the rotor proximate to the stator), and for removing heat from areas of the stator generating heat, such as areas of the stator proximate to the rotor. And windings associated with the stator through which electric energy is flowed so as to generate the rotation of the rotor relative to the stator.

In order to more effectively and efficiently remove heat from components of the electric axle, the present disclosure includes embodiments of an electric axle comprising an electric motor having a stator and a rotor, a coolant manifold mounted to a first end plate of the rotor, the first end plate opposite a second end plate distal to the coolant manifold, wherein the coolant manifold is configured to flow coolant to rotor coolant lines extending axially through the rotor, and a spray ring comprising coolant lines coupled to the coolant manifold, wherein coolant flowing from the coolant manifold to the spray ring flows in a direction angled to an axial direction, wherein the spray ring is positioned circumferentially about axial stator end windings and configured to spray coolant onto an outer diameter of the end windings, wherein the first end plate and the second end plate are configured to spray coolant onto an inner diameter of the end windings.

In various embodiments, an electric axle rotor and spray ring cooling system comprises combinations of the features disclosed herein.

In various embodiments, an electric motor comprises cooling features as described in the present disclosure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The advantages described herein will be more fully understood by reading an example of an embodiment, referred to herein as the Detailed Description, when taken alone or with reference to the drawings, where:

FIG. 6 shows a cross-sectional view of the electric motor taken along an x-y plane;

FIG. 7 shows a second cross-sectional view of the electric motor taken along the x-y plane and rotated relative to FIG. 6;

DETAILED DESCRIPTION

Figure 5:
FIG. 5 shows a coolant flow block diagram.

The present inventors discovered and determined the designs described herein, having two different direct cooling methods using oil working together. First, the coolant (e.g., oil) may be directed to both front and back hairpin winding heads through two cooling rings inserted between the hairpin head outer diameter (OD) and the cooling jacket inner diameter (ID). Second, oil flowing through the rotor is sprayed from the rotor endplates to the hairpin heads inner diameter. This flow of oil is also used to cool the rotor lamination stacks and ensure a controlled magnet temperature. The oil may then flow down via gravity and to a sump cavity, where an electrical pump and oil filtration feed the gear box or the gears/gear train to provide additional direct cooling. FIG. 5 illustrates an example coolant flow block diagram.

Figure 1:
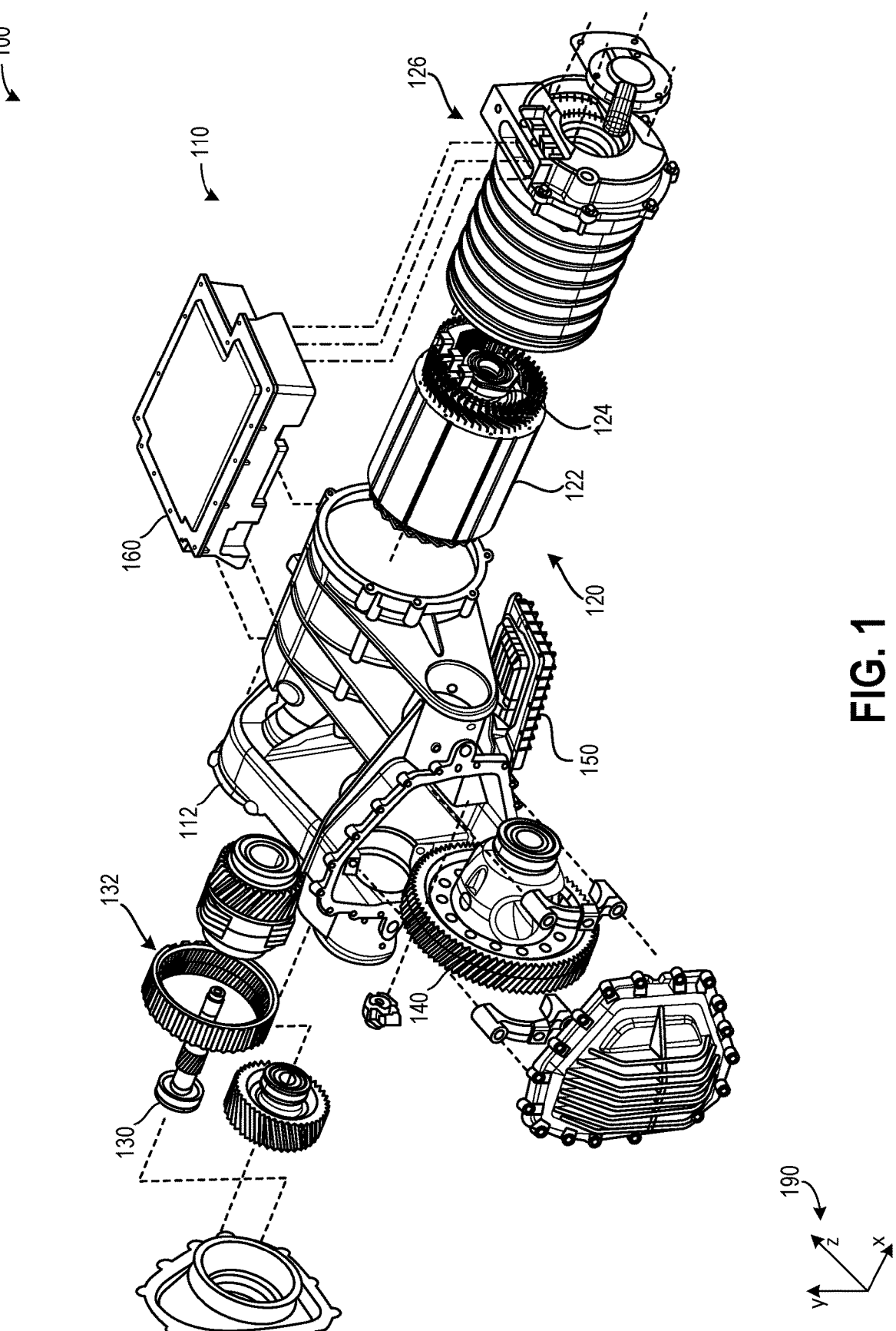
FIG. 1 shows an exploded view of a portion of an electric axle.
Figure 2:
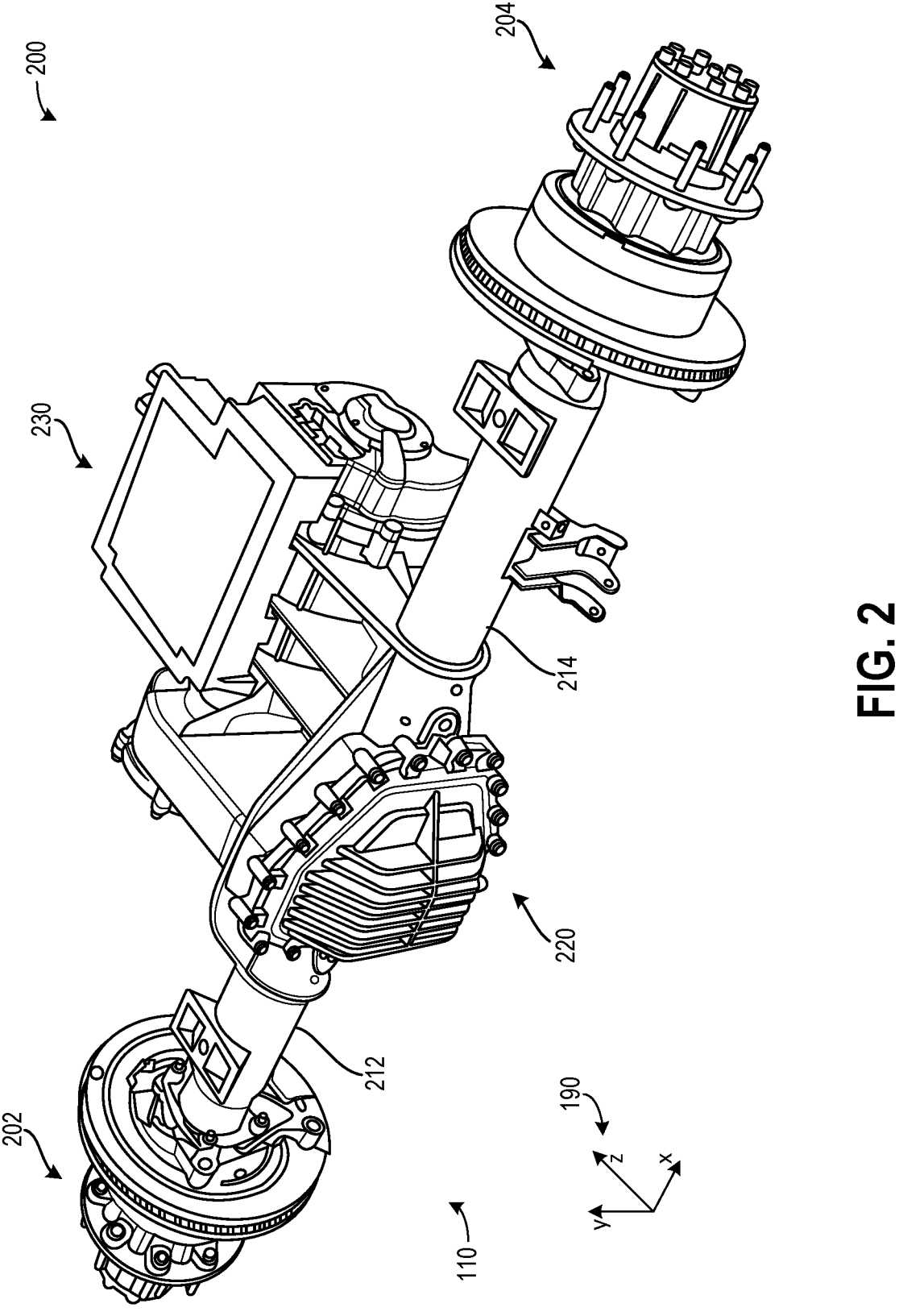
FIG. 2 shows an assembly of the electric axle.
Figure 3:
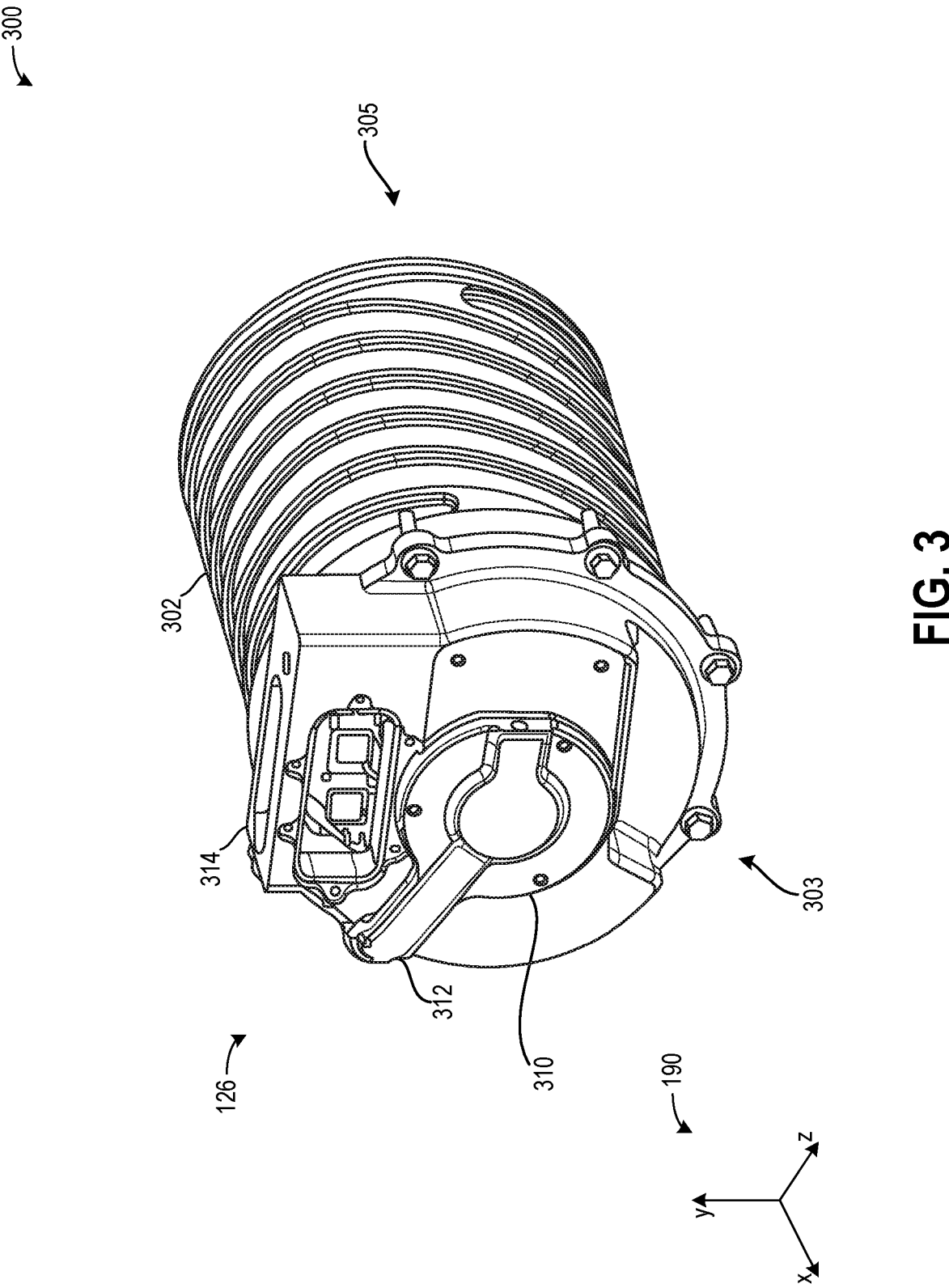
FIG. 3 shows an assembly of a cooling jacket of the electric axle.
Figure 4:
FIG. 4 shows an electric motor including a rotor positioned within a stator.
Figure 8:
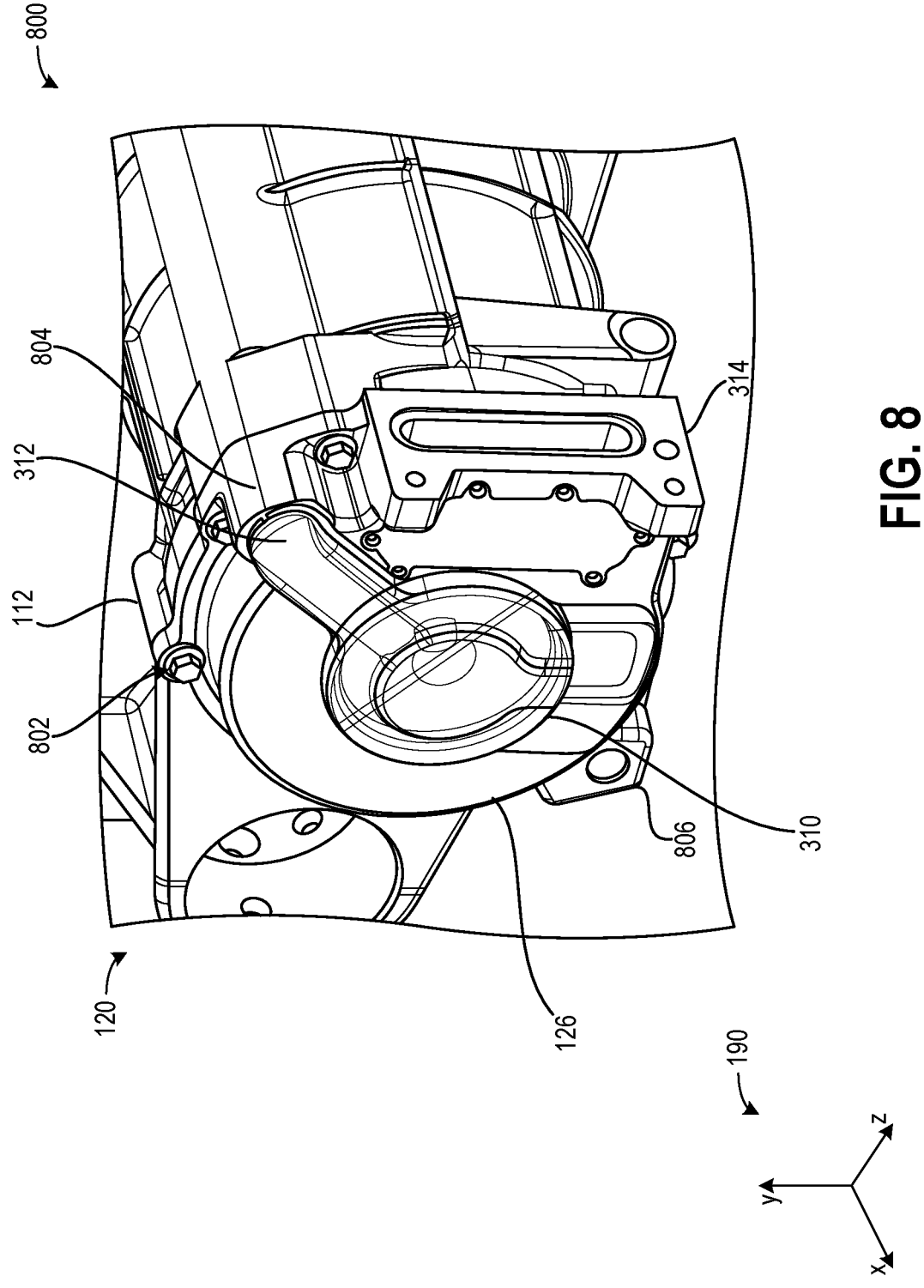
FIG. 8 shows a view of a coolant manifold coupled to the cooling jacket.
Figure 9:
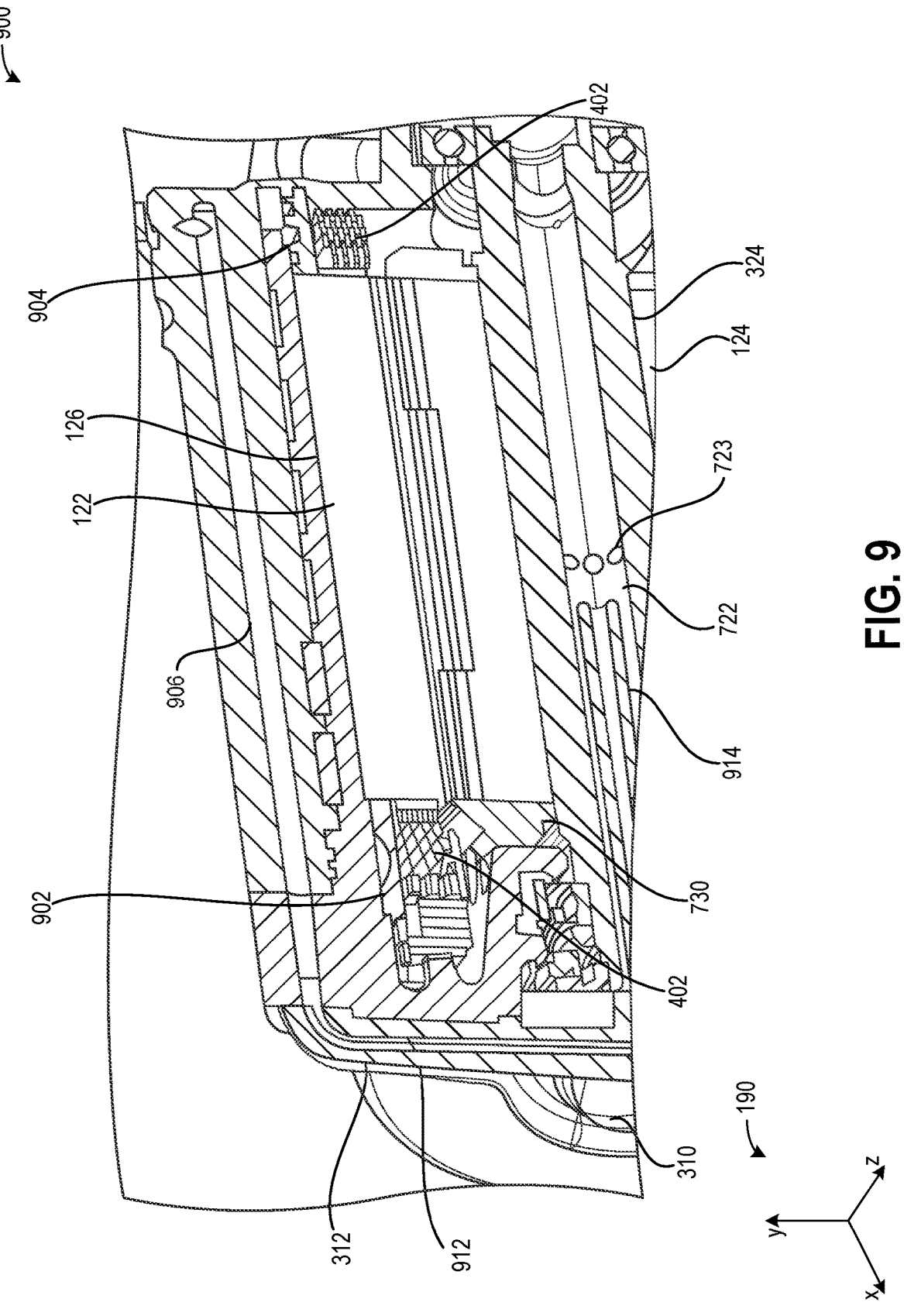
FIG. 9 shows a view of polymer cooling rings proximal to windings of the stator.
Figure 10:
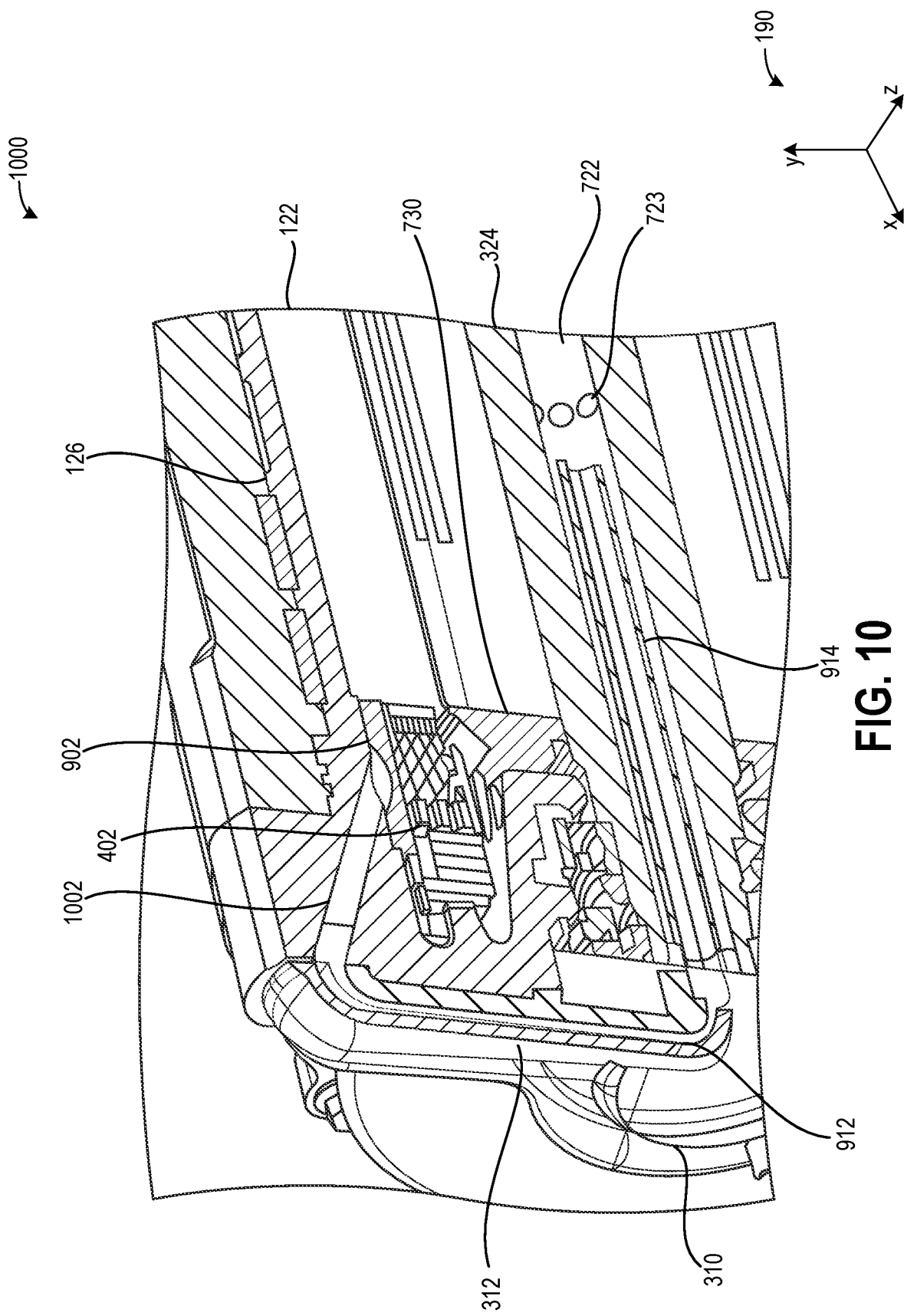
FIG. 10 shows the coolant manifold including coolant channels coupled to an upper portion of a spray ring and into an axial shaft of the rotor.
Figure 11:
FIG. 11 shows an opposite end of the electric motor distal to the coolant manifold.
Figure 12:
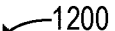
FIG. 12 shows an embodiment of the spray ring.
Figure 12:
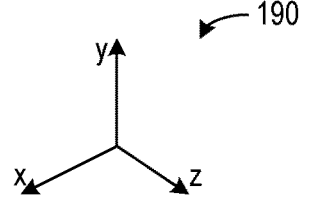

FIG. 1 shows an exploded view of a portion of an electric axle. FIG. 2 shows an assembly of the electric axle. FIG. 3 shows an assembly of a cooling jacket of the electric axle. FIG. 4 shows an electric motor including a rotor positioned within a stator. FIG. 6 shows a cross-sectional view of the electric motor taken along an x-y plane. FIG. 7 shows a second cross-sectional view of the electric motor taken along the x-y plane and rotated relative to FIG. 6. FIG. 8 shows a view of a coolant manifold coupled to the cooling jacket. FIG. 9 shows a view of polymer cooling rings proximal to windings of the stator. FIG. 10 shows the coolant manifold including coolant channels coupled to an upper portion of a spray ring and into an axial shaft of the rotor. FIG. 11 shows an opposite end of the electric motor distal to the coolant manifold. FIG. 12 shows an embodiment of the spray ring.

FIG. 1 shows an exploded view 100 of a portion of an electric axle 110, according to embodiments. As shown, an electric motor 120 comprising a (hairpin type) cylindrical stator 122 (core) and a rotor 124 positioned therein, may be enveloped by a cooling jacket 126. The cooling jacket 126 (with rotor and stator positioned therein) may be fit within the motor enclosure/housing 112. The channels shown circumferentially on the cooling jacket, combined with the inside surface of the enclosure/housing 112 (or carrier/case) provide paths for a coolant fluid (such as water or other coolant fluid composition) to flow across the circumferential surfaces of the cooling jacket, to thereby remove heat from the stator core positioned therewithin. Also as shown in the exploded view of FIG. 1, a drive shaft 130 of the electric motor (along the motor's axis of rotation) may be gearably connected to a differential 140, via gears 132 in such a manner as to drive half shafts (and wheel ends) drivably connected thereto. An inverter 150 is shown that may be affixed to the carrier/case 112, the inverter 150 providing electrical energy to the rotor 124 and stator 122.

FIG. 2 shows an assembly 200 of the electric axle 110, according to embodiments. As shown, an exemplary electric axle may comprise wheel ends, half shafts, a differential, and gears connected to the output shaft of an electric motor. As such, components previously introduced may be similarly numbered in this and subsequent figures.

The assembly 200 may include a first wheel mount 202 and a second wheel mount 204. The first wheel mount 202 may be arranged at a first extreme end of a first axle half 212. The second wheel mount 204 may be arranged at a second extreme end of a second axle half 214, the second extreme end opposite the first extreme end. The first axle half 212 and the second axle half 214 may couple to opposite sides of a gearbox housing 220. The gearbox housing 220 may house one or more gears and may be further coupled to a transmission 230.

FIG. 3 shows an embodiment 300 of the cooling jacket 126 as shown in FIG. 1, according to embodiments. The cooling jacket 126 is shown with a circumferentially oriented rib 302 that, when coupled with the interior surface of the carrier/case within which the jacket assembly insertably fits, create channels for coolant fluid to flow across the exterior surface of the cooling jacket 126, thereby removing heat therefrom (effectively pulling heat away from the stator core material surrounded by the cooling jacket). The carrier/case may be a housing of an electric motor, such as electric motor 120 of FIG. 1.

In one example, the rib 302 is shaped via a single groove etched into a surface of the cooling jacket 126. The rib 302 may traverse a circumference of the cooling jacket 126 multiple times as it extends from a first side 303 of the cooling jacket 126 to a second side 305. In one example, the rib 302 may include a helical shape that extends at an angle relative to the circumference of the cooling jacket 126.

A coolant manifold 310 is shown on the end of the cooling jacket 126. In one example, the coolant manifold 310 is an end mounted coolant manifold. The end mounted coolant manifold 310 receives coolant fluid (such as oil) and supplies the oil to both a channel within the rotor shaft (for directly cooling the rotor) and a channel within the carrier/case (for supplying oil to a pair of cooling rings/spray rings situated proximate each end of the stator core so that the coolant oil may be sprayed radially inward onto the head outside diameter (or head OD, or end windings) of the stator.

The coolant manifold 310 may include a spray arm 312 extending radially outward from a center therefrom. A passage may extend from the center and through an entirety of the spray arm 312. The passage may flow coolant to multiple axial coolant passages arranged within the rotor and the cooling jacket 126. The spray arm 312 may be arranged proximally to a junction box 314. In one example, the junction box 314 may function as an electrical interface for wires and other electric devices to electrically couple to components within the cooling jacket. An interior of the junction box 314 may be sealed from coolant.

FIG. 4 shows the electric motor 120 including the rotor 124 positioned within the stator 122, as shown in the exploded view of FIG. 1, according to embodiments. In one example, the cooling jacket 126, the coolant manifold 310, the spray arm 312, and the junction box 314 of FIG. 3 are omitted to reveal the stator 122 in the view of FIG. 4. The rotor 124 is surrounded by the stator core. The stator 122 may comprise hairpin windings 402 that, as shown, extend out of the stator core axially at each end, the extending portions of the windings referred to as end windings or stator head. The axially opposed end windings (or heads) each have an inside diameter (ID) and an outside diameter (OD).

FIG. 5 shows a block diagram 500 showing coolant flows, according to embodiments. The block diagram 500 shown comprises exemplary coolant flows and may be referred to as a boundary diagram. Boundaries of system components are illustrated via solid lines with no arrows at both ends. As shown, the e-axle 110 (electric axle) comprises a carrier 112 comprising a gear train 132 therewithin and an inverter 150 atop the carrier 112, positioned above the motor 120 portion of the assembly. Oil (or coolant fluid), illustrated via dash lines, flows from a water to oil heat exchanger into the end mount coolant feed manifold 310 (shown in FIG. 3) to provide oil into channel in a rotor shaft 324. The oil entering the rotor shaft 324 may flow to the middle of the rotor 124, axially mid-way between the rotor ends and stator end windings. The oil then flows through radially outward directed channels within the rotor 124 to channels running axially (parallel to the axis of rotation of the rotor 124) along radially outward portions of the rotor 124 before exiting the rotor 124 via rotor end caps. The rotor end caps may include orifices sized and directed therein to direct cooling oil onto the end windings inner diameter (head ID) thereby cooling the end windings ID. The oil then gravitationally flows downward to a motor sump and potentially through portions of the gear train housing/cavity, where a pump 320 then sends the oil back to the water to oil heat exchanger (upper right in the diagram shown in FIG. 5).

From the coolant feed manifold 310 (shown in FIG. 3), coolant oil is also, in addition to the rotor shaft channel, directed into cooling rings (interchangeably referred to as spray rings). The oil may flow directly via channels into the spray ring structure for a spray ring proximate the coolant feed manifold. Additionally or alternatively, for a spray ring positioned between the carrier and/or a cooling jacket and the stator end windings (head OD) axially opposite from the coolant feed manifold, the oil may flow through at least one channel in the carrier and is fed into the spray ring. Orifices in the spray rings (such as those illustrated in FIG. 12) are sized and oriented so as to spray coolant oil onto the end windings OD (head OD).

In this way, coolant oil is used to both directly cool the rotor and the end windings ID, and cool the end windings OD via the cooling rings/spray rings. Further, a cooling is provided by the cooling jacket via WEG cooling lines, shown via solid arrow lines. Solid arrow lines are differentiated from dashed arrow lines in that the solid lines are continuous with no disruptions to the line. The cooling lines provide coolant, such as water, to the coolant jacket channels to thereby cool the circumferential surfaces surrounding the stator core. The WEG cooling lines extend, as shown in FIG. 5, to the water to oil heat exchanger, and also WEG cooling lines connect from the vehicle cooling systems.

FIG. 6 is a cut view 600 of the electric motor 120, as shown in FIG. 1, according to embodiments. The motor 120 may comprise the hairpin type stator 122 with hairpin connections at one (axial) end of the stator, and are referred to as end windings 402 (or the stator heads). Each of the hairpins may comprise hairpin wire and/or magnetic wire of rectangular cross-section. In one example, the electric motor 120 is an AC motor. The motor comprises what may be referred to as stator hybrid cooling, whereby cooling is accomplished using front and back end winding oil cooling, as well as WEG jacket cooling (for active length cooling along the axial exterior surfaces of the stator core, via the cooling jacket and the cooling fluid channels circumferentially disposed thereon). Further, rotor cooling (shown in FIG. 7) is provided via direct oil cooling of the rotor core (via cooling oil fed into the rotor shaft as previously described). The motor 120 may further include the coolant feed manifold 310 and the spray arm 312 for feeding various coolant passages within the motor 120. For example, the rotor shaft 324 may include a rotor passage 602 therein and configured to receive coolant. The rotor passage 602 may include at least one radially outward oriented opening for spray coolant from the rotor shaft 324 to other components, such as the rotor 124 or another passage. The spray arm 312 may further direct coolant to the coolant jacket 126 radially outside of the stator 122.

FIG. 7 shows a detailed view 700 of the rotor cooling, according to embodiments. As previously described, cooling fluid (such as oil) may be directed into the rotor shaft 324 via a rotor shaft channel 722. The rotor shaft channel 722 extends through at least a portion of the rotor shaft 324 and comprises radially outward oriented openings 723 for spraying coolant from the rotor shaft 324 to the rotor or another axial channel. An example single radially outward opening is illustrated in FIG. 6. In one example, the rotor shaft channel 722 extends through an entire length of the rotor shaft 324. The plurality of radially outward oriented channels 723 may be symmetrically or asymmetrically arranged along the rotor shaft channel 722 and positioned to provide enhanced cooling to targeted areas.

The rotor shaft 324 extends through a first end plate 730 and a second end plate 732. The first end plate 730 is arranged adjacent the coolant manifold 310. The second end plate 732 is arranged distal to the coolant manifold 310 at an opposite side of the rotor 124 relative to the first end plate 730. More specifically, the coolant manifold 310 may be arranged at a first side of the electric motor 120, opposite to a second side of the electric motor 120 is an output side, wherein the output side includes a gear and/or a shaft for transmitting power from the electric motor 120 to a gearbox.

As illustrated, the first end plate 730 and the second end plate 732 may comprise different cross-sectional shapes. The second end plate 732 may include a ring-shaped body 742 with a single height protrusion extending therefrom. The protrusion may be shaped via an angled surface 744 and an axial surface 746 extending from the ring-shaped body 742 and coupling to a radial surface 748. The angled surface 744 faces an inner diameter of stator end windings and may include a channel extending therethrough for spraying coolant onto the end windings.

The end windings may be coupled to outer leads arranged adjacent to an outer axial passage (e.g., the first passage 906 of FIG. 9).

The first end plate 730 may include a ring-shaped body 752. As such, both the first end plate 730 and the second end plate 732 may extend around an entire circumference of the rotor 124. The first end plate 730 may include a first protrusion and a second protrusion extending from the ring-shaped body 752. The first protrusion may be shaped via a first axial surface 753 and a first radial surface 754. The first radial surface 754 is coupled to the first axial surface 753 and to a first angled surface 755. The first angled surface 755, a second radial surface 756, and a second angled surface 757 may shape the second protrusion. The second radial surface 756 may be coupled to each of the first angled surface 755 and the second angled surface 757. The second angled surface 757 may be further coupled to the ring-shaped body 752 and faces an inner diameter of the stator end windings.

As illustrated, an angle of the second angled surface 757 may be less than an angle of the angled surface 744 relative to the axial direction, parallel to the x-axis. The angle of the second angled surface 757 is between 5 to 30 degrees and the angle of the angled surface 744 is between 35 to 65 degrees. In another embodiment, the angle of the second angled surface 757 is between 5 to 25 degrees and the angle of the angled surface 744 is between 45 to 65 degrees. In one example, the angle of the second angled surface 757 is less than 20 degrees and the angle of the angled surface 744 is greater than 45 degrees.

FIG. 8 shows a closer detail perspective view 800 of the end mounted coolant manifold 310 (or rotor coolant feed manifold, or rotor and spray ring coolant feed manifold) assembled to the cooling jacket as in FIG. 3 and further assembled into the outer case/enclosure housing shown in the exploded view of FIG. 1, according to embodiments. As illustrated, the coolant manifold 310 is inserted into the cooling jacket 126, wherein the cooling jacket 126 is physically coupled the housing 112 via a plurality of fasteners 802. The cooling jacket 126 further comprises an interface 804 (e.g., a boss) which is configured to couple to a housing cover, such as housing cover 160 of FIG. 1. The spray arm 312 extends in a direction toward a gear train (e.g., gears 132) and is adjacent to the interface 804.

The coolant manifold 310 may include a disc shape. The coolant manifold 310 may be arranged along a central axis, parallel to an axial direction, of the electric motor 120. The spray arm 312 may extend from the coolant manifold 310 toward the interface 804. The spray arm 312 may extend toward an area between two of the plurality of fasteners 802. Additionally, the spray arm 312 may extend directly opposite a mounting feature 806 of the electric motor 120. The spray arm 312 is adjacent to an extreme end of the junction box 314. The spray arm 312 is sealed from an interior of the junction box 314.

FIG. 9 shows a view 900 showing stator end windings 402 radially between a spray ring and the first and second rotor endplates 730, 732, respectively. As shown, the coolant feed manifold 310 provides a channel 906 for supplying cooling oil into one or both of first and second cooling rings 902, 904, respectively. As shown, the first channel 906 extends axially across the carrier and includes auxiliary channels for supplying cooling oil into both the first cooling ring 902 and the second cooling ring 904. The first cooling ring 902 is closer to the coolant feed manifold 310 than the second cooling ring 904. The first channel 906 may be fluidly coupled to a radial arm passage 912 of the spray arm 312. The radial arm passage 912 may flow coolant to each of the first channel 906 and the rotor shaft passage 722. The first channel 906 and the rotor shaft passage 722 are parallel to one another and extend in the axial direction. In one example, an insert 914 may extend from the spray arm 312 and into the rotor shaft passage 722.

FIG. 10 shows a view 1000 illustrating the end mounted coolant feed manifold with coolant channels to a top of the spray ring and into the axial shaft of the rotor at a first end, according to embodiments. FIG. 10 further illustrates the first cooling ring 902 adjacent to the radial arm 312 and the rotor end plate 730. The holes in the first cooling ring 902 and the second cooling ring (e.g., second cooling ring 904 of FIG. 9) are sized and oriented so as to spray cooling oil onto the outer diameter of the end windings (or head OD) of the stator 122. The oil then gravitationally flows down into the sump system below the rotor and stator. Also shown in FIGS. 10 and 11) are channels through which cooling oil is supplied directly into the rotor shaft, through radially oriented passages that then connect to channels extending axially (in a number of channels positioned across the circumference of the rotor) which end with the holes in the rotor end caps so that the oil sprays outward and preferably is directed to the end windings inner diameter (head ID) so as to further cool the stator end windings. The oil exiting the rotor end caps and onto the stator end windings then gravitationally flows downward into the motor sump system.

The radial arm passage 912 may flow coolant to an angled passage 1002 fluidly coupled to the first cooling ring 902. The radial arm passage 912 may thus be bifurcated and configured to flow coolant to each of the angled passage 1002 and the first passage 906 at a radially outer end. The radial arm passage 912 may be further configured to flow coolant to the rotor shaft passage 722 at a radially inner end. Additionally or alternatively, there may be multiple radial arm passages.

FIG. 11 shows a view 1100 illustrating the end mounted coolant feed manifold with coolant channels to a top of the spray ring and into the axial shaft of the rotor at a second end, opposite the first end, according to embodiments.

FIG. 12 shows an enlarged detail view 1200 of a spray ring 1202, which may be identical to the first spray ring 902 and/or the second spray ring 904 of FIG. 9, according to embodiments. As shown, the spray ring 1202 comprises at least one channel (formed between an exterior surface/outside diameter surface and the inner surface of the cooling jacket) and comprises a plurality of orifices 1204 or holes through which cooling oil may be sprayed and directed toward the end windings of the stator. The plurality of orifices 1204 may extend around a portion of the circumference of the spray ring 1202. In one example, the plurality of orifices 1204 extend around less than half the circumference of the spray ring 1202. Additionally or alternatively, the plurality of orifices 1204 may extend around an entirety of the circumference of the spray ring 1202. The plurality of orifices 1204 may be configured to spray lubricant toward an outer diameter of the rotor end windings. Additionally or alternatively, the plurality of orifices 1204 may include a uniform flow through area. In other examples, the plurality of orifices 1204 may include a non-uniform flow through area configured to accelerate lubricant flow toward the end windings.

FIGS. 1-4 and 6-12 are shown approximately to scale. However, other relative dimensions may be used if desired.

FIGS. 1-4 and 6-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The disclosure provides support for an electric axle including an electric motor having a stator and a rotor, a coolant manifold mounted to a first end plate of the rotor, the first end plate opposite a second end plate distal to the coolant manifold, wherein the coolant manifold is configured to flow coolant to rotor coolant lines extending axially through the rotor, and a spray ring comprising coolant lines coupled to the coolant manifold, wherein coolant flowing from the coolant manifold to the spray ring flows in a direction angled to an axial direction, wherein the spray ring is positioned circumferentially about axial stator end windings and configured to spray coolant onto an outer diameter of the end windings, wherein the first end plate and the second end plate are configured to spray coolant onto an inner diameter of the end windings. A first example of the electric axle further includes where the first end plate and the second end plate are identical. A second example of the electric axle, optionally including the first example, further includes where the first end plate and the second end plate comprise an angled surface facing the inner diameter of the end windings, and wherein coolant is sprayed from a passage extending through the angled surface to the inner diameter of the end windings. A third example of the electric axle, optionally including one or more of the previous examples, further includes where an angle of the angled surface is less than 35 degrees relative to the axial direction. A fourth example of the electric axle, optionally including one or more of the previous examples, further includes where the first end plate and the second end plate comprise a first protrusion including a first angled surface and a second angled surface and a second protrusion include a radial surface and an axial surface, wherein coolant is sprayed from the first angled surface to the inner diameter of the end windings. A fifth example of the electric axle, optionally including one or more of the previous examples, further includes where the first end plate and the second end plate receive coolant from a rotor shaft passage. A sixth example of the electric axle, optionally including one or more of the previous examples, further includes where the rotor shaft passage extends through an entire length of a rotor shaft in the axial direction and feeds coolant to an axial passage coupled to the first end plate and the second end plate via radially oriented outlets. A seventh example of the electric axle, optionally including one or more of the previous examples, further includes where the first end plate and the second end plate are different.

The disclosure provides additional support for a system including an electric axle, an electric motor including a stator and a rotor arranged in a housing, a coolant manifold inserted through an end plate of the rotor, wherein the coolant manifold is fluidly coupled to an outer axial channel arranged between a cooling jacket and the stator and a rotor shaft passage arranged in a rotor shaft, the coolant manifold comprising a radial arm extending from a center of the coolant manifold to an inner axial channel, and a spray ring arranged adjacent to the coolant manifold and the end plate, the spray ring configured to direct coolant from the outer axial channel to an outer diameter of the end windings and the end plate configured to direct coolant from the inner axial channel to an inner diameter of the end windings. A first example of the system further includes where the end plate comprises a first protrusion and a second protrusion, the second protrusion extending farther in an axial direction than the second protrusion. A second example of the system, optionally including the first example, further includes where the second protrusion comprises a first angled surface and a second angled surface, wherein the first angled surface is coupled to a radial surface of the first protrusion. A third example of the system, optionally including one or more of the previous examples, further includes where an angle of the first angled surface and the second angled surface is acute relative to the axial direction. A fourth example of the system, optionally including one or more of the previous examples, further includes where the second angled surface comprises an outlet through which coolant is sprayed onto the inner diameter of the end windings. A fifth example of the system, optionally including one or more of the previous examples, further includes where the end plate is a first end plate, further comprising a second end plate arranged at an opposite end of the rotor relative to the first end plate. A sixth example of the system, optionally including one or more of the previous examples, further includes where the second end plate comprises a different shape than the first end plate, wherein the second end plate directs coolant at the inner diameter of the end windings proximal to the opposite end. A seventh example of the system, optionally including one or more of the previous examples, further includes where the spray ring is a first spray ring, further comprising a second spray ring at the opposite end of the rotor, wherein first end windings extend between the first spray ring and the first end plate and second end windings extend between the second spray ring and the second end plate.

The disclosure provides further support for an electric axle including an electric motor having a stator and a rotor, rotor coolant lines extending axially through the rotor so as to receive coolant via an end mounted coolant manifold and flow the coolant axially within the rotor to radially directed flow lines which connect with coolant heat transfer lines running axially along radially outward channels within a radially outward portion of the rotor so as to transfer heat therefrom, the radially outward rotor channels flowing coolant axially toward axial ends of the rotor, and out of rotor end plates via directed flow orifices, directing coolant onto axial end windings of the stator, wherein the rotor end plates include a first end plate through which the end mounted coolant manifold and a second end plate distal to the end mounted coolant manifold, wherein the first end plate and the second end plate comprise an angled surface with the directed flow orifices for spraying coolant onto an inner diameter of the axial end windings, spray ring coolant lines feeding coolant to coolant spray rings positioned circumferentially about each of the axial end windings, the coolant spray rings receiving coolant from coolant lines within an electric motor carrier or carrier coolant manifold, the carrier coolant manifold further configured to transfer heat from radially outward circumferential surfaces of a stator core, and the spray rings receiving coolant and flowing the coolant out of the interior circumference of the spray rings via spray ring directed flow orifices, directing coolant onto axial end windings of the stator, and a motor sump system configured to receive coolant that has been flowed onto the stator end windings, the sump system having a pump for returning the coolant to a heat exchanger, whereafter the coolant returns to the coolant manifold. A first example of the electric axle further includes where the first end plate comprises a first protrusion and a second protrusion, and wherein the second end plate comprises only one protrusion. A second example of the electric axle, optionally including the first example, further includes where the first end plate and the second end plate are identical. A third example of the electric axle, optionally including one or more of the previous examples, further includes where the angled surface of the first end plate is acute relative to an axial direction.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle comprising:
a gear train;
an electric motor having a stator and a rotor;
a housing cover enclosing the electric motor;
a coolant manifold mounted to a first end plate of the rotor, the first end plate opposite a second end plate distal to the coolant manifold, wherein the coolant manifold is configured to flow coolant to rotor coolant lines extending axially through the rotor, and wherein the coolant manifold is inserted into a cooling jacket and comprises a spray arm that extends in a direction toward the gear train, the cooling jacket is enclosed within a housing, and wherein the cooling jacket comprises an interface configured to couple to the housing cover; and
a spray ring comprising coolant lines coupled to the coolant manifold, wherein coolant flowing from the coolant manifold to the spray ring flows in a direction angled to an axial direction, wherein the spray ring is positioned circumferentially about axial stator end windings and configured to spray coolant onto an outer diameter of the end windings, wherein
the first end plate and the second end plate are configured to spray coolant onto an inner diameter of the end windings, wherein the first end plate and the second end plate are separate components.

2. The electric axle of claim 1, wherein the first end plate and the second end plate are identical.

3. The electric axle of claim 1, wherein the first end plate and the second end plate comprise an angled surface facing the inner diameter of the end windings, and wherein coolant is sprayed from a passage extending through the angled surface to the inner diameter of the end windings.

4. The electric axle of claim 3, wherein an angle of the angled surface is less than 35 degrees relative to the axial direction.

5. The electric axle of claim 1, wherein the first end plate and the second end plate comprise a first protrusion including a first angled surface and a second angled surface and a second protrusion include a radial surface and an axial surface, wherein coolant is sprayed from the first angled surface to the inner diameter of the end windings.

6. The electric axle of claim 1, wherein the first end plate and the second end plate receive coolant from a rotor shaft passage of a rotor shaft, and wherein the rotor shaft extends through the first end plate and the second end plate.

7. The electric axle of claim 6, wherein the rotor shaft passage extends through an entire length of the rotor shaft in the axial direction and feeds coolant to an axial passage coupled to the first end plate and the second end plate via radially oriented outlets.

8. The electric axle of claim 1, wherein the first end plate and the second end plate are different and extend around an entire circumference of the rotor.

9. A system, comprising:
a gear train;
an electric axle;
an electric motor including a stator and a rotor arranged in a housing;
a coolant manifold inserted through an end plate of the rotor, wherein the coolant manifold is fluidly coupled to an outer axial passage arranged between a cooling jacket and the stator and a rotor shaft channel arranged in a rotor shaft, the coolant manifold comprising a radial arm extending toward the gear train from a center of the coolant manifold to the rotor shaft channel, and wherein the cooling jacket is fit within the housing and comprises an interface that is configured to couple to a housing cover; and
a spray ring arranged adjacent to the coolant manifold and the end plate, the spray ring configured to direct coolant from the outer axial passage to an outer diameter of end windings and the end plate configured to direct coolant from the rotor shaft channel to an inner diameter of the end windings; wherein
the end plate is a first end plate, further comprising a second end plate that is separate from the first end plate, wherein the second end plate is configured to direct coolant from the rotor shaft channel to the inner diameter of the end windings via an orifice.

10. The system of claim 9, wherein the end plate comprises a first protrusion and a second protrusion, the second protrusion extending farther in an axial direction than the first protrusion.

11. The system of claim 10, wherein the second protrusion comprises a first angled surface and a second angled surface, wherein the first angled surface is coupled to a radial surface of the first protrusion.

12. The system of claim 11, wherein an angle of the first angled surface and the second angled surface is acute relative to the axial direction.

13. The system of claim 11, wherein the second angled surface comprises an outlet through which coolant is sprayed onto the inner diameter of the end windings.

14. The system of claim 10, wherein the second end plate is arranged at an opposite end of the rotor relative to the first end plate.

15. The system of claim 14, wherein the second end plate comprises a different shape than the first end plate, wherein the second end plate directs coolant at the inner diameter of the end windings proximal to the opposite end.

16. The system of claim 14, wherein the spray ring is a first spray ring, further comprising a second spray ring at the opposite end of the rotor, wherein first end windings extend between the first spray ring and the first end plate and second end windings extend between the second spray ring and the second end plate.

17. An electric axle comprising:
an electric motor having a stator and a rotor;
a housing in which the electric motor and a cooling jacket are arranged;
rotor coolant lines extending axially through the rotor so as to receive coolant via an end mounted coolant manifold and flow the coolant axially within the rotor to radially directed flow lines which connect with coolant heat transfer lines running axially along radially outward channels within a radially outward portion of the rotor so as to transfer heat therefrom, wherein the end mounted coolant manifold comprises a spray arm that extends radially toward a gear train, the end mounted coolant manifold is assembled to the cooling jacket and to the housing, and wherein the cooling jacket comprises an interface configured to couple to a housing cover;

the radially outward rotor channels flowing coolant axially toward axial ends of the rotor, and out of rotor end plates via directed flow orifices, directing coolant onto axial end windings of the stator, wherein the rotor end plates include a first end plate through which the end mounted coolant manifold extends and a second end plate distal to the end mounted coolant manifold, wherein the first end plate and the second end plate comprise an angled surface with the directed flow orifices for spraying coolant onto an inner diameter of the axial end windings, wherein the first end plate and the second end plate are separate components;

spray ring coolant lines feeding coolant to coolant spray rings positioned circumferentially about each of the axial end windings, the coolant spray rings receiving coolant from coolant lines within an electric motor carrier or carrier coolant manifold, the carrier coolant manifold further configured to transfer heat from radially outward circumferential surfaces of a stator core, and the spray rings receiving coolant and flowing the coolant out of an interior circumference of the spray rings via spray ring directed flow orifices, directing coolant onto axial end windings of the stator; and a motor sump system configured to receive coolant that has been flowed onto the axial end windings, the sump system having a pump for returning the coolant to a heat exchanger, whereafter the coolant returns to the coolant manifold.

18. The electric axle of claim 17, wherein the first end plate comprises a first protrusion and a second protrusion, and wherein the second end plate comprises only one protrusion, and wherein the first end plate comprises a shape different than the second end plate.

19. The electric axle of claim 17, wherein the first end plate and the second end plate are identical.

20. The electric axle of claim 17, wherein the angled surface of the first end plate is acute relative to an axial direction, and wherein an angle of the angled surface of the first end plate is different than an angle of the angled surface of the second end plate.

* * * * *